United States Patent  [11] 3,615,654

| [72] | Inventors | Yaichi Ayukawa<br>Tokyo;<br>Seishi Shinya, Chiba; Masaki Tamura,<br>Tokyo, all of Japan |
|---|---|---|
| [21] | Appl. No. | 729,922 |
| [22] | Filed | May 17, 1968 |
| [45] | Patented | Oct. 26, 1971 |
| [73] | Assignee | CPC International Inc. |

[54] METHOD OF TREATING MICROBIAL CELLS
23 Claims, No Drawings

[52] U.S. Cl. .................................................... 99/9,
99/1, 99/14, 99/97
[51] Int. Cl. ...................................................... A23k 1/00
[50] Field of Search ............................................ 99/2, 9, 14,
17, 18, 96, 97; 260/112, 211.5; 195/1, 28

[56] References Cited
UNITED STATES PATENTS

| 1,213,545 | 1/1917 | Ringler et al. ................ | 99/97 |
|---|---|---|---|
| 2,233,251 | 2/1941 | Draghi ........................... | 99/96 |
| 3,411,989 | 11/1968 | Nakao ........................... | 260/211.5 |

*Primary Examiner* — Lionel M. Shapiro
*Assistant Examiner* — Robert M. Elliott
*Attorneys* — Frank E. Robbins, James L. Bailey, Janet E. Price, Robert D. Weist and Martha A. Michaels ABSTRACT: Covers a method for upgrading microbial cells. Particularly covers a method of treating microbial cells found in micro-organisms such as yeast, bacteria, fungi, algae, etc. by contacting the cells with anhydrous liquid ammonia. The thus treated cells are improved with respect to such characteristics such as odor, color, taste, etc. and have increased protein content. Microbial cells such as yeast which have a substantial ribonucleic acid content when thus treated are found to have a decreased ribonucleic acid content.

METHOD OF TREATING MICROBIAL CELLS

A number of methods have been proposed with respect to treating microbial cells and improving them with respect to a number of desirable characteristics, such as odor, color, taste, and other qualities. Thus, organic solvents such as methanol, ethanol, acetone, methyl ethyl ketone and other liquids have been utilized in order to improve the color and odor characteristics of microbial cells and improve their taste characteristics by removing bitter tasting components.

These methods, while useful to a degree, have not been entirely successful. In some instances, there is only a slight improvement of the cell characteristics, much less than the sought degree of improvement. In other situations the treatment takes an excessive amount of time, leading to an undesirable overall high economic cost. Again, in some cases it is difficult if not impossible to separate the thus treated microbial cells from the treatment reagent. Other drawbacks have also been noted in carrying out prior art methods of this type involving solvent extraction techniques.

In related schemes nucleic acids and particularly ribonucleic acid are extracted from a variety of microbial cells, and particularly yeast cells by contact with various liquids. For example, use of aqueous salt or alkaline solutions have been proposed as well as use of organic liquids such as phenol, alkyl sulfonate salts and the like. Again, employment of these treatment reagents has not been entirely successful, and in many instances only minimal amounts of ribonucleic acid have been extracted. As is known ribonucleic acid is useful in a wide variety of end-uses, such as in the food industry, particularly if it is of relatively high purity.

It would be a considerable advance in the art if a method were known of treating microbial cells whereby the resultant cells had improved characteristics of odor, taste, color and other characteristics. It would be an added advantage if this treatment also led to cells of increased protein content, which cells would have greater utility in industries utilizing such cells. Still further advantages would accrue if this same mode of treatment could be utilized to successfully extract substantial contents of ribonucleic acid from the treated microbial cells if ribonucleic acid is present in the cells to a significant degree. Such mode of treatment would be particularly useful in extracting ribonucleic acid from yeast cells.

In view of the above, it therefore becomes an object of the invention to provide a method for upgrading microbial cells.

A more specific object of the invention is to provide a method of treating microbial cells whereby the cells are improved with respect to characteristics of odor, color, taste and other properties and have increased protein content.

A still further object of the invention is to upgrade microbial cells with respect to the above properties which cells are found in micro-organisms such as yeast, bacteria, fungi, algae and the like.

A still further object of the invention is to treat microbial cells such as yeast cells which contain substantial amounts of ribonucleic acid whereby through such treatment the ribonucleic acid content in said cells is decreased and the ribonucleic acid thus realized is utilized for a number of end-uses.

Yet another object of the invention is to provide purified microbial cells realized through the method of the invention.

Other objects will appear hereinafter.

In accordance with the invention we have discovered a method of treating microbial cells whereby said cells are improved with respect to a number of properties. Specifically, the cells are upgraded with respect to characteristics of odor, color and taste and have found to possess increased protein content after the treatment step. Also, as an added benefit those microbial cells which contain nucleic acids such as ribonucleic acid and deoxyribonucleic acid have been found to have a decreased nucleic acid content after being subjected to the method of the invention. The nucleic acids thus extracted can be easily recovered and subsequently utilized.

In its broadest aspects the method of the invention comprises the steps of treating microbial cells with anhydrous liquid ammonia hereinafter referred to as ammonia or liquid ammonia. The thus upgraded microbial cells are then separated from the ammonia and utilized for their intended end-use. As noted above, these cells have improved properties. Moreover, the process of the invention does not appear to impose any harmful side-effects upon the cells or impart to them deleterious properties and characteristics.

The method of the invention has wide application, particularly in that a great number of varying types of microbial cells may be treated. The term "microbial cells" as used herein is to be broadly applied and to include the cells or mycellia of diverse micro-organisms such as yeast, bacteria, fungi, algae, etc. Thus, any cell which is found in various micro-organisms may be treated through contact with ammonia, which cells may be then utilized in the food, feed, pharmaceutical, fermentation and other industries.

As a consequence such cells or mycellia may be treated which are found in various micro-organisms such as yeast, for example, *Candida utilis*, *C. tropicalis*, *C. arborea*, *Saccharomyces cerevisiae*, *Torulopsis utilis*, *Mycotorula japonica*, *Hansenula anomala*, *Zygosaccharomyces lactis* etc.; fungi, e.g. *Penicillium notatum*, *P. chrysogenum*, *P. flavo-glaucum*, *Aspergillus oryzae*, *A. niger*, *Rhizopus nigricans* etc.; bacteria, e.g. *Micrococcus glutamicus*, *Escherichia coli*, *Aerobacter aerogenes*, *Clostridium butylicum*, *Fungi inperfecti*, e.g. *Oidium lactis*, *Fuasrium lini*, *F. graminearum*, *Actinomycetes*, e.g. *Streptomyces griseus* and others, and single cell green-algae, e.g. *Scendesmus obliquus*, *Chlorella ellipsoidea*, *Ch. vulgaris*, *Ch. pyrenoidosa* etc.

Preferred microbial cells for treatment via the subject invention are yeast cells in any form such as wet yeast, roll dried yeast, spray dried yeast, and whole and ruptured yeast cells.

Ammonia is a well-known article of commerce and needs little elaboration. A typical liquid ammonia source, greatly preferred here, has the following physical properties:

TABLE I

Physical Properties of Liquid Ammonia

| Boiling point | Freezing point | Critical Temperature | Critical pressure | Specific gravity |
|---|---|---|---|---|
| −33.35° C. | −77.7° C. | 132° C. | 112 atm. | 0.6901 (−40° C.) |

The following specific discussion as to operation of the invention will relate to use of liquid ammonia. It is understood, of course, that aqueous ammonia solutions may also be used although with far less efficiency with respect to producing products of the desired characteristics compared to anhydrous liquid ammonia employment.

The actual method of treating the above cells or others usually involves immersion of the cells in the liquid ammonia. During addition of the cells to the ammonia it is preferred that the entire medium be mildly agitated. The cells suspended in ammonia may be then mildly agitated over a greater or lesser time depending upon the degree of purification desired. It has been noted that purification increases with increase in contact time.

In a still further embodiment the cells are extracted with ammonia via a number of repeated extractions, say from two up to about 20 extractions with fresh ammonia. More often, the cells are extracted two to 10 times with ammonia if one carries out this scheme of treatment. In a still further embodiment the cells may be continuously extracted via known countercurrent extraction techniques. In any case all that is necessary is that the cells be intimately contacted with the liquid ammonia in some manner.

The amount of liquid ammonia utilized in relation to the amount of cells being treated will widely vary depending upon the species of micro-organism being purified, type of extraction technique as noted above, and other variables. Usually, the amount of liquid ammonia used in proportion to the amount of cells in any one contact ranges from less than 10 times the volume of ammonia per cell volume, and preferably less than five times the volume of ammonia against cell volume. Usually the amount of ammonia used in relation to the amount of cells treated on a volume basis ranges from about two to about four times.

The time of contact of the microbial cells with liquid ammonia will widely vary depending upon the degree of extraction of impurities sought, the particular micro-organism being treated, and other factors. Usually each contact time will be less than 4 hours, more often less than 3 hours, and in the usual case is less than 30 minutes. Of course, it is noted above the cells may be repeatedly contacted with the ammonia. If a countercurrent extraction technique is employed, this measurably increases the efficiency of the treatment, and decreases the time of contact necessary to obtain the sought after purified cells.

The treatment temperature should be below the boiling point ($-33.4°$ C.) of the liquid ammonia, and may be carried out at any temperature below this point. One of the distinct advantages of the method of the invention lies in the fact that since the treatment is conducted at such low temperature there is little or no chance for the desirable constituents retained in the treated cells to deteriorate during the treatment.

In the last step of the invention the purified microbial cells are separated from the liquid ammonia solution by conventional techniques. These may include decantation, filtration, centrifugation and so forth.

If one desires, the ammonia from the treatment step containing extracted materials may be evaporated to produce a useful extract. For example, it has been found that the extract from yeast cells may be used as additives to fermentation media, as cattle and poultry feeds, and so forth. Again, if yeast or other materials containing ribonucleic acid are treated with the liquid ammonia these may be recovered from the ammonia agent after separation of the treated cells from the ammonia. Thus by means of evaporation of the ammonia the desired ribonucleic acid constituent may be obtained. If desired the acid may be purified by conventional techniques. In like manner the chlorophylls and caroteens extracted from Chlorella single cell green-algae may be recovered in high yields by evaporating off the ammonia extraction agent.

As will be shown below the purified microbial cells have improved qualities of less color and odor, considerable lessening of bitter taste and improved protein content. In this respect the cells are especially suitable for use in various foods and feeds as a protein-intensifier.

In one specific embodiment of the invention the cells are first frozen and then treated with liquid ammonia. We have found that through this expedient the cells have an even higher protein content, and nucleic acids are taken out in higher yields. Moreover, the nucleic acids are recovered in an easier manner and exhibit no tendency to break down during the process.

Thus, yeast such as yeast cakes may be frozen (60–65% moisture) and treated with liquid ammonia. This leads to increased ribonucleic acid recovery and other advantages as just discussed.

In a further embodiment of the invention, and in a particularly preferred expedient, the thus treated microbial cells after separation from the liquid ammonia are subsequently treated with a hydrophilic solvent. This subsequent treatment tends to purify the cells to an even greater degree, and particularly results in cells having further increased protein content. Also, if microbial cells such as the yeast are treated with the hydrophilic solvent the ribonucleic acid present is even more efficiently extracted from the microbial cells and in materially increased yields. The hydrophilic solvents which may be used include water or aqueous salt or base solutions. For example, such aqueous solutions as sodium chloride solutions, sodium hydroxide solutions or ammonium hydroxide solutions may be utilized. Likewise, hydrophilic organic substances may be used here as extraction agents. Methanol, ethanol, and acetone are typical solvents of this type.

The extraction with the hydrophilic solvent is usually carried out in the same manner as was the previous extraction with liquid ammonia, with the exception that the treatment temperature is higher. Usually the temperature of treatment is around room temperature or slightly below. This again tends to prevent deterioration of the treated microbial cells.

The purified cells are then separated from the hydrophilic solvent by conventional techniques, washed with water, and/or a hydrophilic organic solvent, dried, and then pulverized to obtain the final improved microbial cell product. As noted above, the cells treated with the dual treatment are particularly abundant in digestible protein and are suitable for various foods and pharmaceuticals as a protein-intensifier. Moreover they are greatly improved with respect to odor, color and taste.

When ribonucleic acid is present in the originally treated microbial cells such as in Torula yeast it is particularly advantageous from an economical standpoint to recover the ribonucleic acid by dual treatment, that is, treatment with liquid ammonia followed by further contact of the once-purified cells with a hydrophilic solution such as water or salt or base solutions as enumerated above. After the final separation of the purified cells from the hydrophilic solvent, the ribonucleic acid may be best recovered by acidifying the solution extractant such as an aqueous solution to a pH ranging from about 1.5 to about 2.5 by addition of any appropriate organic or inorganic acids. The accrued ribonucleic acid then separates out as a precipitate. The crude material is separated from the liquid phase by centrifugation and then purified by an adequate method. One excellent purification method is set out by Clark and Schryver in Biochem. J., 11, 319 (1917). Relatively pure ribonucleic acid is thereby attained.

The following samples illustrate typical facets of the invention. These examples are only meant to be exemplary, and the invention is not to be limited thereto. Percentages expressed below are in terms of weight percent unless otherwise indicated.

EXAMPLE I

In this series of experiments the method of the invention was carried out and compared to like extractions utilizing methanol instead of liquid ammonia. The methanol was chosen as a basis of comparison since prior to discovery of use of the liquid ammonia reagent, methanol had given best results in terms of diminishing color, odor, and taste, increasing protein content, etc.

In the first series of runs 3 grams dry basis of *Torula* yeast was soaked in 30 ml. methanol at room temperature for various periods of time. The yeast suspension was stirred continuously. After a set soak time the yeast cells were then filtered on a sintered-glass funnel, washed with 30 ml. methanol and dried in a vacuum oven for 3 hours at 100–105° C. The cells were then weighed to determine loss of weight. The amount of material extracted with the methanol reagent increased almost in a linear relationship with soaking-time, and reached an equilibrium after six hours of extraction. Only after such time was there satisfactory deodorization. Again there was only a slight improvement in color by means of the 6 hour extraction, and the bitter taste of the thus treated cells was not affected by the treatment.

In like manner, the same *Torula* yeast was extracted with liquid ammonia. Here 45.1 grams, dry basis, of *Torula* yeast was added to 300 ml. of liquid ammonia, while stirring effected. The cell suspension was stirred for 5 minutes, let stand for about 4 minutes and the supernatant decanted and a fresh 300 ml. portion of liquid ammonia added to the cells. The extractions were successively repeated for a total of eight times. The liquid ammonia in each case was evaporated and extracts recovered which were dried in a vacuum desiccator. In this instance an equilibrium in the amount of liquid ammonia extract was attained after only six successive 5-minute extractions. After two extractions the color bodies were almost completely removed. After three extractions the bitter components were removed and after six extractions the thus treated yeast cells had substantially no odor.

Thus it can be readily seen that the liquid ammonia treatment is far more efficient than and superior in performance to the prior art methanol treatment. Moreover, there was noted an increase in protein content and a decrease in free amino acid, ribonucleic acid and sugar contents with respect to yeast treated with liquid ammonia. These sugar constituents are believed to be the origin of the unpleasant factors of color, odor and bitterness.

EXAMPLE II

Here, 300 ml. of liquid ammonia was drawn into a 500 ml. beaker directly from a steel container of commercial refrigeration-grade ammonia. To this was added 50 g., on a dry basis of commercial Torula yeast (Candida utilis) in a number of portions while the liquid ammonia was continuously being stirred. After addition of the yeast the cell suspension was stirred for 30 minutes at a temperature of about −45° C. to about −50° C. After the cell suspension was left standing for an additional 5 minutes, the supernatant was removed by decantation. Another 300 ml. portion of fresh liquid ammonia was added to the yeast cells remaining in the beaker. The cell suspension was then stirred for 3 minutes, left standing for 5 minutes, and then the supernatant was removed by decantation.

300 ml. methanol was then added to the partially purified cells and this cell suspension was also stirred for a short period of time. The finally treated yeast cells were filtered on a sintered-glass funnel, dried overnight in a vacuum desiccator, pulverized, and then again dried in a vacuum-oven at 100°–105° C. for 3 hours.

44.2 grams of a completely odorless and tasteless (free of bitter taste) yeast cells were obtained in this run. The yeast cells had only a very faint color.

The cells were then analyzed as follows. The figures in parenthesis represent the analytical values for the original yeast cells. The analytical data are: crude protein N–9.4% (8.3%), true protein N–8.1% (7.6%), digestible protein N–7.2% (6.6%), free amino acid N–0.4% (0.7%), total sugar–17.6% (24.0%), ribonucleic acid–8.2% (8.5%), deoxyribonucleic acid–0.4% (0.4%), total nucleic acid–8.6% (8.9%).

Thus it can be seen that the treated yeast cells were measurably increased with respect to protein content, and had their sugar and ribonucleic acid contents lowered.

EXAMPLE III

Here, commercial Torula yeast used for feed was treated with liquid ammonia as described in example II. The finally produced yeast cells were completely free of odor and taste and had measurably improved color. The yield was 88.4%. The yeast cells analyzed as follows: crude protein N–7.5% (6.5%), true protein N–6.2% (5.7%), digestible protein N–3.8% (3.1%).

As is seen from the above, the treated yeast cells were improved with respect to a number of characteristics as enumerated, and as well had substantially increased protein content after the treatment. Thus, even with benefit of liquid ammonia alone without subsequent treatment with a hydrophilic solvent, the properties of the cells were measurably altered in a desirable manner.

EXAMPLE IV

Commercial beer yeast (Saccharomyces cerevisiae) was treated with liquid ammonia substantially as described in example II. The cells were obtained with a 83.5 percent recovery. Again, the cells were completely free of any odor or bitter taste and had only a faint color.

Analysis of the cells before and after treatment is as follows: crude protein N–8.6% (8.4%), true protein N–7.4% (6.8%), digestible protein N–6.7% (6.1%), free amino acid N–0.47% (0.82%).

EXAMPLE V

In this experiment Micrococcus glutamicus, a gram-positive bacteria employed for the production of glutamic acid, was treated with liquid ammonia substantially in the manner described in example II. The purified odorless bacterial cells having only a faint color were obtained in a 85.4 percent yield.

The analytical data were as follows: crude protein N–12.0% (12.8%), true protein N–10.9% (9.5%), and digestible protein N–8.9% (7.6%).

Thus, it can be seen that the process of the invention is adaptable to treatment of a wide number of microbial cells, and the thus purified cells are much improved with respect to desirable characteristics, and particularly show increased protein contents.

EXAMPLE VI 300 ml. of liquid ammonia was placed in a 500 ml. beaker. To the ammonia was added with stirring 50 g. (dry basis) of a single cell green-algae (Chlorella ellipsoidea) cells in a number of portions. The homogeneous cell suspension was then stirred for 30 minutes at −40° C., and then 300 ml. of methanol was added in order to precipitate the Chlorella cells. The cells were then filtered on a sintered-glass funnel, washed with 200 ml. of methanol, dried in a vacuum desiccator, and then dried in a vacuum-oven kept at 100°–105° C. The lightly green colored, almost completely odorless Chlorella cells were obtained in a 80 percent recovery.

These cells before and after treatment analyzed as follows: crude protein–55.4% (45.3%), digestible protein–38.9% (14.6%), and protein digestibility percent (B/A×100)–70.2% (32.3%).

It can again be readily seen from the above data that via treatment of cells utilizing the method of the invention there was a remarkable improvement by way of increase in protein content and protein digestibility. Also, again it should be noted that the method of the invention is widely applicable, and in this case was successfully used to treat algae.

EXAMPLE VII

In this experiment commercial Torula yeast (50 g. on a dry basis) was soaked in about 300 ml. of liquid ammonia for 5 minutes, substantially in the same manner as described in example II. After the supernatant was removed by decantation, another 300 ml. portion of liquid ammonia was added to the remaining yeast cells, and the extraction continued. The 5-minutes extraction was repeated successively for a total of six times.

Thereafter, 300 ml. of water was added to the yeast cells which had been separated from the liquid ammonia solution by decantation, and the aqueous cell suspension was kept standing at room temperature for 10 hours while being occasionally shaked. The cells were filtered on a sintered-glass funnel, washed with a 300 ml. portion of water, and dried in the usual manner. The purified cells obtained in a 74 percent yield analyzed as follows: crude protein N–10.0% (9.8%), true protein N–9.7% (8.9%), digestible protein N–8.6% (7.1%), protein digestibility percent (B/A×100)–86.4% (73%), ribonucleic acid–1.2% (10.1%), deoxyribonucleic acid–0% (0.1%), total nucleic acid–1.2% (10.2%).

The just enumerated data clearly shows a substantial reduction with respect to total nucleic acid and ribonucleic acid via treatment according to procedures outlined here.

EXAMPLE VIII

Torula yeast (50 g. on a dry basis) was treated with liquid ammonia in the manner described in example II. After the supernatant liquid ammonia solution was decanted to another beaker, the ammonia remaining was evaporated off the yeast cells until about 15 g. ammonia remained with the cells. Then 300 ml. water was added to the yeast cells, and the aqueous cell suspension stirred for 2 hours at room temperature. The yeast cells were separated from the aqueous solution by centrifugation, washed with another 300 ml. portion of cold water and dried. The purified yeast cells obtained in an 81.6 percent yield exhibited the following analytical values: crude protein N–8.6% (8.3%), true protein N–8.3% (7.6%), digestible protein N–7.9% (6.6%), ribonucleic acid–1.8% (8.5%).

The supernatant liquid ammonia solution was then evaporated to obtain a residue which was added to the above aqueous solution. Insoluble matter was separated by centrifugation, and the aqueous solution was acidified to a pH of 1.5 by appropriate addition of hydrochloric acid. The acidified solution was then maintained overnight in a refrigerator. The crude ribonucleic acid obtained was then separated from the mother liquor by centrifuging, and immediately dissolved in 400 ml. of a 10 percent sodium acetate solution by heating for 1 hour in a water bath. After being cooled to room temperature, the solution was submitted to further centrifugation to remove insolubilized matter. To the clear solution was then added 80 ml. 95 percent ethanol, and further acidification made to a pH of 1.5 by addition of hydrochloric acid whereupon the purified ribonucleic acid was precipitated. The acid was centrifuged, washed with 60% ethanol, absolute ethanol, ether and dried in a vacuum oven. There was thereby obtained 2.64 g. (62% yield based on the theoretical amount) of pure ribonucleic acid having 8.5% phosphorus and 15.1% nitrogen contents.

EXAMPLE IX

This example illustrates a greatly preferred embodiment of the invention, namely, treatment with liquid ammonia followed by further treatment of the cells with water.

Here, 30 grams (dry basis) of commercial Torula yeast was continuously extracted with liquid ammonia for 24 hours in a soxlet type apparatus. Residual ammonia was then removed by resort to a vacuum dessicator followed by treatment in a 105° C. vacuum oven.

The purified yeast cells obtained in a 80% yield analyzed as follows: crude protein–62.4% (52.2%), true protein–49.7( 47.3%), digestible protein–44.5% (41.6%), and ribonucleic acid–4.3% (8.5%).

Thereafter, 10 g. of the above treated cells was suspended in 60 ml. of water and mildly stirred for 22 hours at room temperature. The cells were then separated by centrifugation, washed with 95 percent ethanol and then dried in the usual manner.

The further purified cells obtained in a 83% yield analyzed as follows: crude protein–62.4% (52.2%), true protein–61.7% (47.3%), digestible protein–54.9% (41.6%), and ribonucleic acid–1.4% (8.5%).

As can be seen from the above data, treatment with liquid ammonia in a continuous manner greatly improved protein content in the yeast cells, and as well measurably decreased ribonucleic acid. Still further treatment with water increased the protein content of the twice-treated cells to even a higher percent and further reduced ribonucleic acid content.

EXAMPLE X

Here another preferred expedient of the invention was practiced, namely, treatment of frozen cells with liquid ammonia.

Specifically, a semifrozen cake containing 25 g. of living brewery yeast cells (dry basis) was first stored in a refrigerator freezer, coarsely granularized and then completely frozen by immersing the vessel containing the yeast in an acetone-dry ice bath. To the frozen yeast was then added 300 ml. of liquid ammonia, and the mixture left standing for 15 minutes without agitation. The supernatant was decanted off and the soaking and decantation steps repeated four times by additions of 50 ml. portions of liquid ammonia.

100 additional ml. of liquid ammonia was then added and the cell suspension stirred for 30 minutes. Again the supernatant was decanted off. 150 ml. of water was then added and residual ammonia evaporated until the suspension of the thus-treated cells contained about 10 percent ammonia. This suspension was then stirred for 4 hours at room temperature.

The cells were again separated by centrifugation, washed with 150 ml. of water, a dilute citric acid aqueous solution, 95 percent ethanol, and then dried in the usual manner.

The almost odorless, colorless, and bitter-free cells obtained in a 62% yield analyzed as follows: crude protein–63.1% (57.4%), true protein–61.1% (47.8%), digestible protein–55.7% (19.1%), and ribonucleic acid–3.8% (7.2%).

Again the cells were remarkably improved with respect to protein content and greatly reduced in cell ribonucleic acid content.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method for the upgrading of microbial cells which comprises the steps of contacting said cells in anhydrous liquid ammonia, maintaining the temperature of below about −33° C. during the contact time and separating said cells whereby said cells are improved with respect to odor, color, taste, and other characteristics and have an increased protein content.

2. The method of claim 1 wherein said contact time is less than 4 hours.

3. The method of claim 1 wherein said contacting is carried out by countercurrent extraction of said cells with anhydrous liquid ammonia.

4. The method of claim 1 wherein said contacting is carried out by repeated extractions of said cells with anhydrous liquid ammonia.

5. The method of claim 1 characterized by the further step of evaporating said liquid ammonia to produce a cell extract useful as an animal feed and for like purposes.

6. The method of claim 1 characterized by the further step of contacting said separate cells with a hydrophilic solvent, separating said cells from said solvent whereby cells of further increased protein content are realized.

7. The method of claim 6 wherein said hydrophilic solvent is selected from the group consisting of alcohols, water, aqueous salt solutions, aqueous base solutions, and ketones.

8. A method for the upgrading of microbial cells found in micro-organisms selected from the group consisting of yeast, bacteria, fungi, and algae, which organisms are utilized in the food, feed, pharmaceutical, fermentation and other industries which comprise the steps of contacting said cells in anhydrous liquid ammonia, maintaining the temperature below about −33° C. during the contact time and separating said cells from said anhydrous liquid ammonia whereby said cells are improved with respect to odor, color, taste and other characteristics and have an increased protein content.

9. The method of claim 8 wherein said contact time is less than 4 hours.

10. The method of claim 8 wherein said contacting is carried out by countercurrent extraction of said cells with anhydrous liquid ammonia.

11. The method of claim 8 wherein said contacting is carried out by repeated extractions of said cells with anhydrous liquid ammonia.

12. The method of claim 8 characterized by the further step of evaporating said liquid ammonia to produce a cell extract useful as an animal feed and for like purposes.

13. The method of claim 8 characterized by the further step of contacting said separate cells with a hydrophilic solvent, separating said cells from said solvent whereby cells of further increased protein content are realized.

14. The method of claim 13 wherein said hydrophilic solvent is selected from the group consisting of alcohols, water, aqueous salt solutions, aqueous base solutions, and ketones.

15. A method for the upgrading of yeast cells which comprises the steps of contacting said cells in anhydrous liquid ammonia maintaining the temperature below about −33° C. during the contact time and separating said cells from said anhydrous liquid ammonia whereby said cells are improved with respect to odor, color, taste, and other characteristics and have an increased protein content.

16. The method of claim 15 wherein said contact time is less than 4 hours.

17. The method of claim 15 wherein said contacting is carried out by countercurrent extraction of said cells with anhydrous liquid ammonia.

18. The method of claim 15 wherein said contacting is carried out by repeated extractions of said cells with anhydrous liquid ammonia.

19. The method of claim 15 characterized by the further step of evaporating said liquid ammonia to produce a cell extract useful as an animal feed and for like purposes.

20. The method of claim 15 characterized by the further step of contacting said separate cells with a hydrophilic solvent, separating said cells from said solvent whereby cells of further increased protein content and further decreased ribonucleic acid content are realized.

21. The method of claim 20 characterized by the further step of recovering ribonucleic acid found in said hydrophilic solvent by separation of said ribonucleic acid from said solvent.

22. The method of claim 20 wherein said hydrophilic solvent is selected from the group consisting of alcohols, water, aqueous salt solutions, aqueous base solutions, and ketones.

23. The method of claim 21 wherein said recovery is effected by acidifying said solvent containing said ribonucleic acid whereby said ribonucleic acid is precipitated out of said solvent.

* * * * *